S. A. GLYNN, W. H. WOLPERT & C. J. HANZEL.
HOSE SUPPORTER.
APPLICATION FILED SEPT. 9, 1918.

1,294,649.

Patented Feb. 18, 1919.

Inventors
Stephen A. Glynn, W. H. Wolpert,
and Charles J. Hanzel,
By Jerry A. Mathews
and Luther L. Sargent, Attorneys

UNITED STATES PATENT OFFICE.

STEPHEN A. GLYNN, WILLIAM H. WOLPERT, AND CHARLES J. HANZEL, OF ANTIGO, WISCONSIN.

HOSE-SUPPORTER.

1,294,649.  Specification of Letters Patent.  Patented Feb. 18, 1919.

Application filed September 9, 1918.  Serial No. 253,329.

*To all whom it may concern:*

Be it known that we, STEPHEN A. GLYNN, WILLIAM H. WOLPERT, and CHARLES J. HANZEL, citizens of the United States, and residents of Antigo, in the county of Langlade and State of Wisconsin, have invented a new and useful Hose-Supporter, of which the following is a specification.

It is the object of our invention to provide a hose supporter having a novel tongued supporting strip of rubber, whereby the hose may be supported without fastening the customary band tightly, or in such way as to restrict circulation of the blood.

Figure 1:
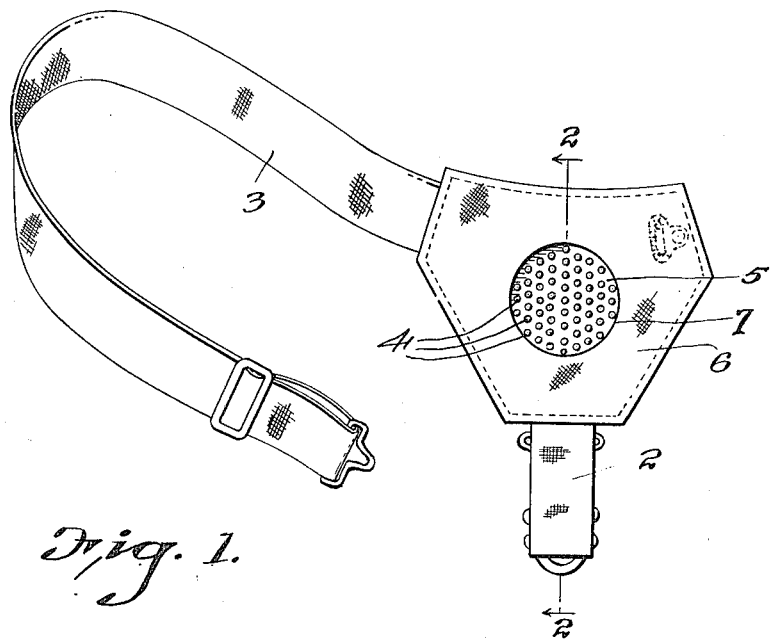
Figure 2:
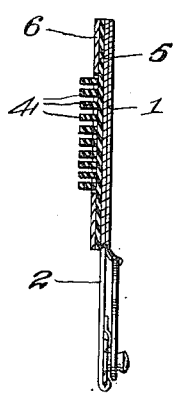

Figure 1 is a perspective of a hose supporter in which our invention is incorporated; and Fig. 2 is a section on line 2—2 of Fig. 1.

Referring to the accompanying drawings we provide a suitable hose engaging clasp 2 attached to a suitable nonelastic flexible strip 6, preferably composed of two pieces of cloth sewed together and inclosing a similarly shaped rubber strip 5 having teeth 4 projecting as shown in Fig. 2, through a suitable opening 7 in the center approximately of the fabric strip 6, as illustrated. Attached to strip 6 is a suitable leg encircling band, such as illustrated.

The rubber teeth 4 by reason of their frictional contact with the underclothes or skin of the wearer afford sufficient support to the hose to make it unnecessary to secure the band 3 disagreeably tight about the leg.

What we claim is:

1. A hose supporter of the type shown, comprising a leg encircling band, a plurality of short fabric strips attached to one end of said band, the inner strip having a relatively large opening, a rubber strip secured between the aforesaid fabric strips, said rubber strip having a multiplicity of short rubber teeth projecting through the opening in the inner fabric strip to frictionally contact with the underclothes or skin of the wearer as a means of support, and a hose engaging clasp secured to the fabric strips, whereby the frictional action of the aforesaid rubber teeth provide adequate support for the hose without securing the leg encircling band tightly about the leg of the wearer.

2. A hose supporter comprising an adjustable leg encircling band, a nonelastic fabric member attached to one end of said band, a hose engaging clasp secured to said fabric member, a rubber strip affixed to said fabric member, said rubber strip having a multiplicity of short rubber teeth projecting toward the leg of the wearer to frictionally contact with the underclothes or skin of the wearer as a means of support for the hose, substantially as and for the purposes hereinbefore described.

STEPHEN A. GLYNN.
WILLIAM H. WOLPERT.
CHARLES J. HANZEL.